United States Patent [19]

Ragan

[11] Patent Number: 5,031,233
[45] Date of Patent: Jul. 9, 1991

[54] SINGLE CHIP RADIO RECEIVER WITH ONE OFF-CHIP FILTER

[75] Inventor: Lawrence H. Ragan, Richardson, Tex.

[73] Assignee: AT&E Corporation, San Francisco, Calif.

[21] Appl. No.: 378,724

[22] Filed: Jul. 11, 1989

[51] Int. Cl.$^5$ .............................................. H03J 15/00
[52] U.S. Cl. ................................ 455/307; 340/825.44; 455/340
[58] Field of Search ............... 455/182, 183, 192, 228, 455/231, 254, 307, 197, 344, 345, 338, 340; 333/24.1, 24 R, 1.1, 215; 340/825.44

[56] References Cited

U.S. PATENT DOCUMENTS

| | | | |
|---|---|---|---|
| 4,177,430 | 12/1979 | Paul | 455/306 |
| 4,528,698 | 7/1985 | Fraser | 455/319 |
| 4,761,829 | 8/1988 | Lynk, Jr. et al. | 455/312 |
| 4,885,801 | 12/1989 | Hansen | 455/264 |
| 4,885,802 | 12/1989 | Ragan | 455/302 |

OTHER PUBLICATIONS

"A Complete Single Chip AM/FM Radio IC" Okanobu et al 6/82.

Continuous-Time Adaptive Recursive Filters, Johns et al, pp. 667–670, 1989 IEEE.

Primary Examiner—Curtis Kuntz
Attorney, Agent, or Firm—Elmer W. Galbi

[57] ABSTRACT

The present invention provides an improved single chip radio receiver which has less external components than do previous similar receivers. With the present invention the integrated circuit which includes the radio receiver also has an on-chip adaptive filter. The radio receiver is designed for use in a radio pager which is only active for a very short time slot during a relative long repeat cycle. Thus the adaptive filter only need remain stable for a short period after its coefficients are adjusted to the desired values. The radio receiver includes an external filter which has the same frequency response as desired from the adaptive filter. Immediately prior to activating the radio receiver, the circuit is activated to adjust the parameters of the adaptive filter so that the adaptive filter matches the external filter. The radio receiver is then activated using both filters in series thereby producing the desired radio reception. The adaptive filter quickly changes characteristics; however, since the radio receiver is only active for a short period of time, operation of the system is not affected.

8 Claims, 3 Drawing Sheets

FIG. 1
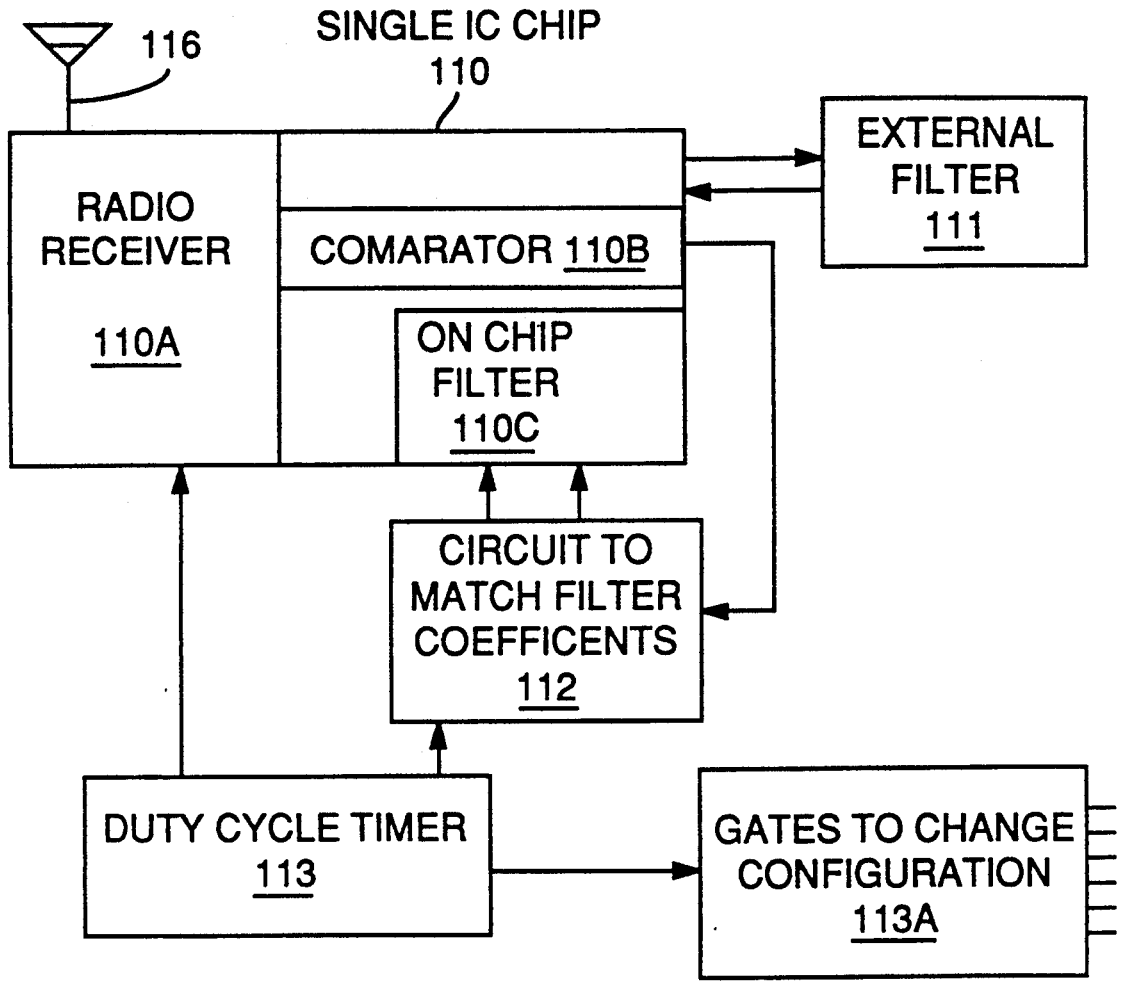
FIG. 2 DUTY CYCLE
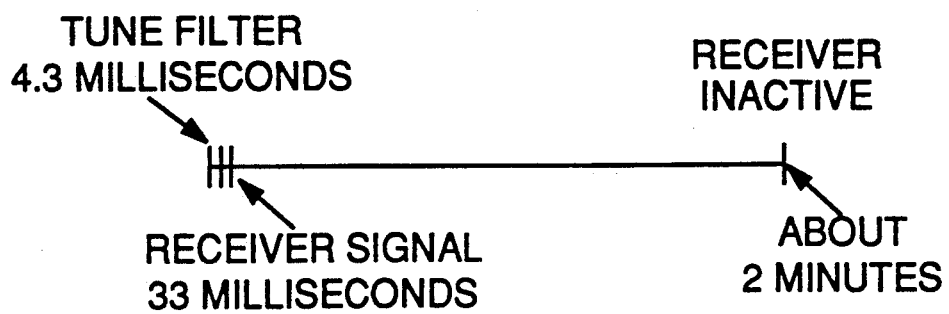

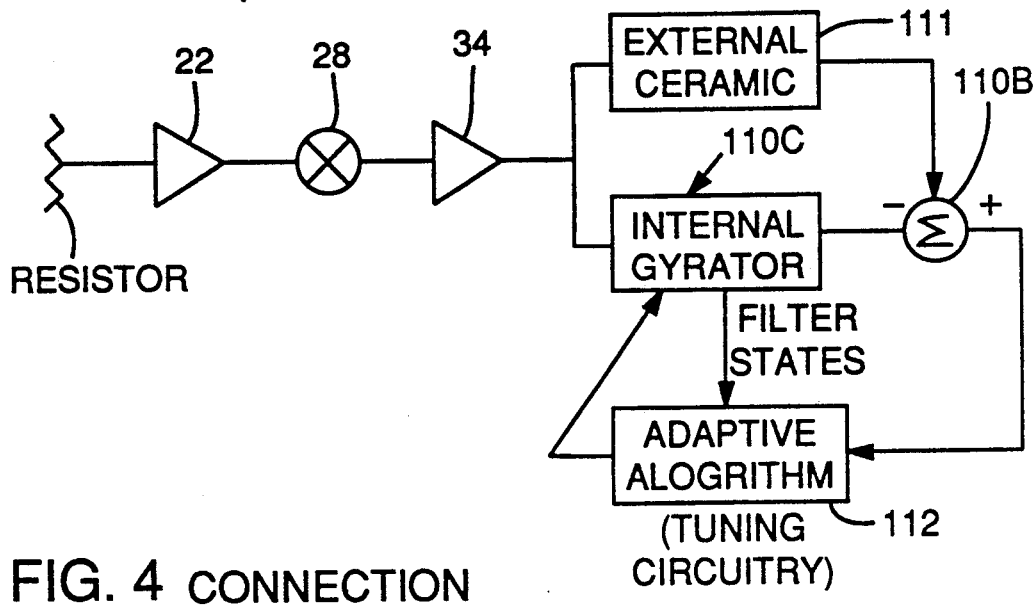
FIG. 3 CONNECTION DURING TUNE TIME (WHILE SYNTHESIZER IS BEING LOCKED)
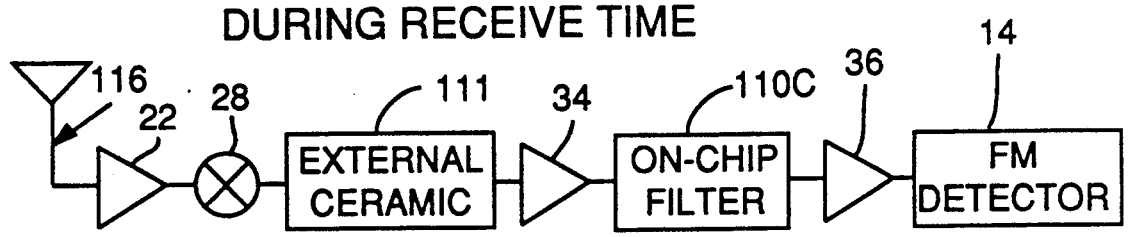
FIG. 4 CONNECTION DURING RECEIVE TIME
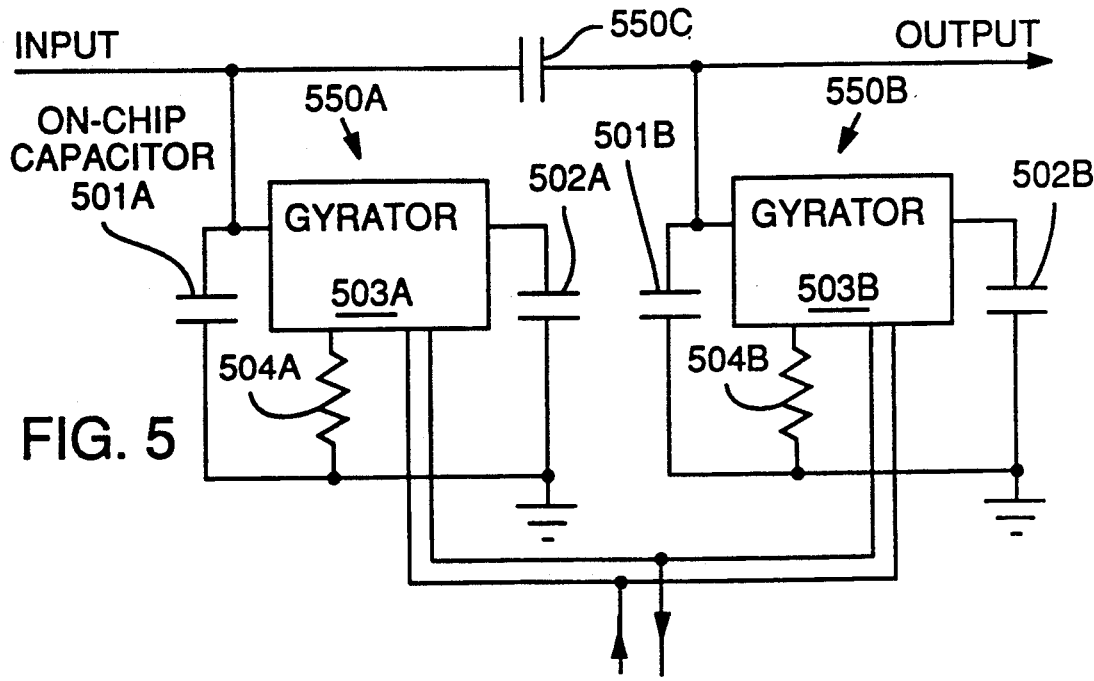
FIG. 5

SINGLE CHIP RADIO RECEIVER WITH ONE OFF-CHIP FILTER

FIELD OF THE INVENTION

The present invention relates to radio receivers and more particularly to IF filters for radio receivers.

BACKGROUND OF THE INVENTION

Copending patent application Ser. No. 07/213,719 filed June 30, 1988 now U.S. Pat. No. 4,885,802 by Lawrence H. Ragan entitled *Wristwatch Receiver Architecture* describes an FM radio receiver suitable for paging applications. The radio receiver shown in the referenced patent application is constructed on a single integrated circuit chip with only a small number of external components. Among the reasons that it is desirable to minimize the number of off-chip components is that such components increase the cost of the unit, they occupy room in the package, and they increase the assembly cost.

The receiver shown in the above referenced patent application includes two off-chip band pass filters. It is possible to build band pass filters on an integrated circuit chip using gyrators to simulate inductors; however, at high frequencies such circuits tend to be unstable. That is, the pass band and the stop band of filters built on an integrated circuit chip using gyrators tend to vary over time because the simulated inductance of a gyrator is a function of the DC bias current through the circuit and it is very difficult to precisely control DC bias current in an integrated circuit chip. In an FM radio receiver, the IF filter is a critical component relative to insuring proper discrimination between stations, hence, it is essential that the IF filter have the proper frequency response, hence, prior art FM receivers generally use external IF filters.

The IF stage of FM radio receivers typically use two 10.7 megahertz two pole filters in series. The radio receiver shown in the above referenced patent application includes two 10.7 megahertz filters as off-chip components.

Adaptive filters, that is, filters whose frequency response is adjustable in response to external signals are known. For example, a paper by W. B. Mikhael and F. F. Yassa entitled "*Stable High Order Continuous Adaptive Filters*" IEE Int. Symp. on Circuits and Systems, pp 666–669, Rome, Italy, May 1982 describes a filter which is adapted in response to an RMS measurement of an error signal. It is also know that one can make an adaptive filter which automatically adapts so that the filter has the same characteristics as does a fixed reference filter. For example a paper by D. A. Johns, W. M. Snelgrove, and A. S. Sedra entitled "*Continuous-Time Analog Adaptive Recursive Filters*" published in ISCAS 1989 pages 667–669 describes how an adaptive filter and a reference filter can be connected s that the adaptive filter's frequency response is made to match that of the reference filter. According to the technique described in this paper, white noise is injected into both the adaptive filter and the reference filter. The adaptive filter is then adjusted so that it produces the same response to the white noise as does the reference filter. At this point, the transfer function of the adaptive filter matches the transfer function of the reference filter.

If an adaptive filter is built on an integrated circuit chip, the filter will only hold the frequency response to which it is adjusted for a relatively short period of time due to the fact that the DC bias current in the integrated circuit will drift thereby changing the value of the inductances in the circuit.

SUMMARY OF THE INVENTION

The present invention provides an improved single chip radio receiver which has less external components than do previous similar receivers. With the present invention the integrated circuit which includes the radio receiver also has an on-chip adaptive filter. The radio receiver is designed for use in a radio pager which is only active for a very short time slot during a relative long repeat cycle. Thus, the adaptive filter only need remain stable for a short period after its coefficients are adjusted to the desired values. The radio receiver includes an external filter which has the same frequency response as desired from the adaptive filter. Immediately prior to activating the radio receiver, the circuit is activated to adjust the parameters of the adaptive filter so that the adaptive filter matches the external filter. The radio receiver is then activated using both filters in series thereby producing the desired radio reception. The adaptive filter quickly changes characteristics; however, since the radio receiver is only active for a short period of time, operation of the system is not affected.

DESCRIPTION OF THE DRAWINGS

FIG. 1 is an overall block diagram of a preferred embodiment of the present invention.

FIG. 2 is a diagram showing the length of the relevant portions of the operating cycle.

FIG. 3 is a block diagram showing how the components are connected during the "adjustment" portion of the cycle.

FIG. 4 is a block diagram showing how the components are connected during the "receive" portion of the cycle.

FIG. 5 is a circuit diagram of a two pole on-chip adjustable IF band pass filter.

DETAILED DESCRIPTION

Figure 6:
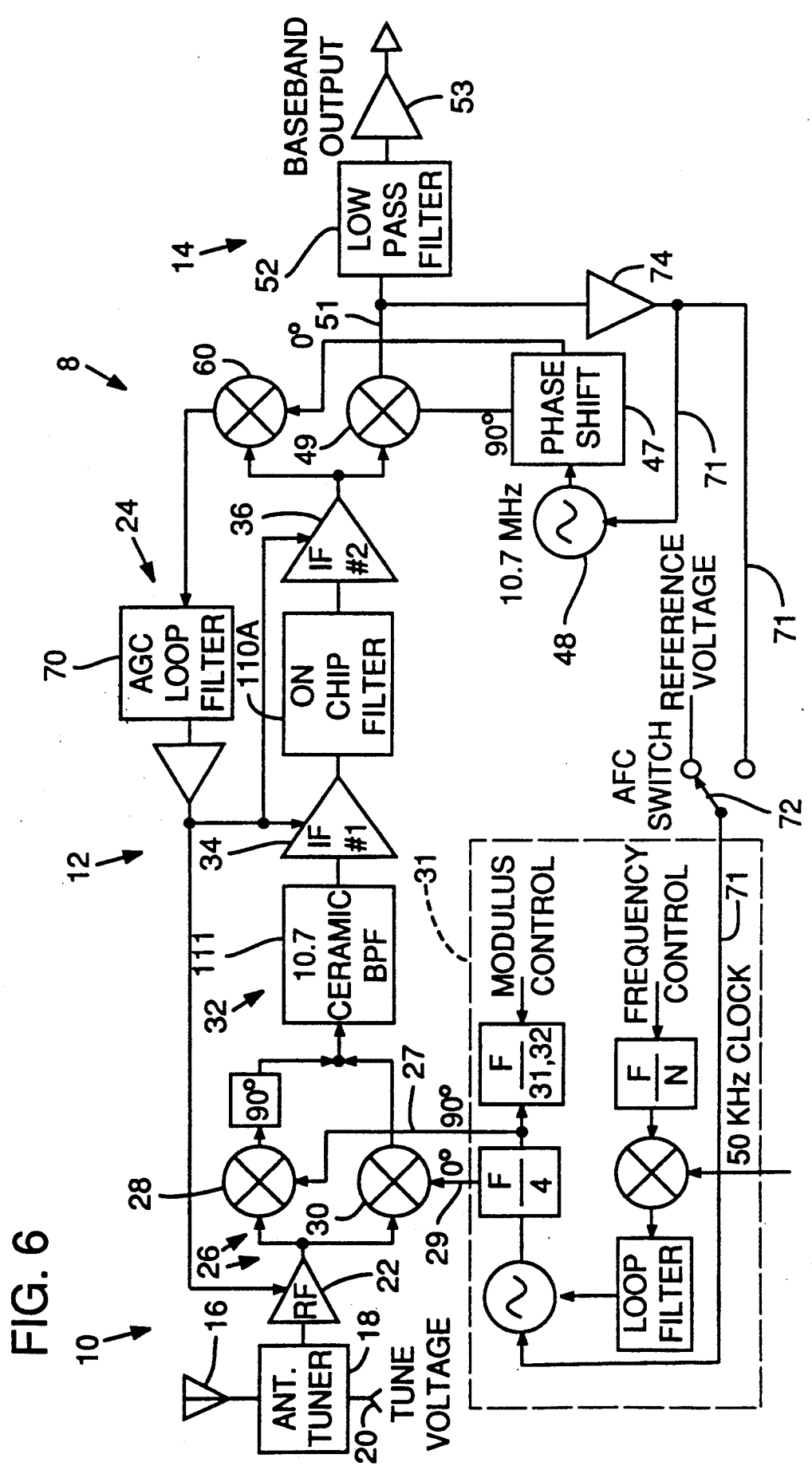
FIG. 6 is a detailed block diagram of a receiver wherein the present invention is applicable.

An overall block diagram of a preferred embodiment of the present invention is shown in FIG. 1. The major components are an integrated circuit chip 110, an external IF filter 111, a filter coefficient adjustment circuit 112, an operating cycle timer 113, and configuration changing gates 113A. The integrated circuit chip 110 includes thereon a radio receiver 110A, an on-chip filter 110C and a signal comparator 110B. The blocks shown in FIG. 1 are not meant to show the actual layout of the components on the chip 110 since the layout of the chip can be conventional and it forms no part of this invention. The details of the radio receiver 110A and its associated external components are shown in FIG. 6 and they will be explained in detail later. It is noted that what is generally termed an FM radio receiver includes IF filters. Herein for the sake of convenience the parts of the radio receiver on integrated chip 110, that is, the radio receiver minus the IF filter, is called a radio receiver.

A key aspect of the present invention is that it reduces the number of external or off-chip components required. The invention is applicable to a receiver system that includes two IF filters. With the present invention one of these filters, namely filter 110A, is implemented on-chip and the second filter 111 is an off-chip component. As will be explained later, the on-chip filter is made to conform to the off-chip filter prior to the activation of the receiver. While the on-chip filter may drift out of the acceptable range of specifications in a relatively short time, the receiver is only activated for a short period and during this period the on-chip filter 110A operates appropriately.

The radio receiver 110A is designed for operation in a time slot paging system such as that shown in U.S. Pat. No. 4,713,808 (Gaskill) wherein the receiver is only active for very short periods, each active period being followed by a relative long period of inactivity. Since the receiver is only active for very short periods, it uses relatively little power. This is important in applications such as where the radio receiver is part of a wristwatch where there are very severe power limitations.

With the present invention the system operates with an operating cycle which has three portions:
First: The on-chip filter 110C is adjusted.
Second: The receiver 110A is turned ON for a short period.
Third: The receiver 110A is OFF for a long period.

FIG. 2 shows the relative length of the three portions of the operating cycle. Key to the present invention is the fact that the first and second portions of the operating cycle are relatively short with respect to the third portion of the operating cycle. The length of the various portions of the operating cycle is shown in FIG. 2.

The components within the system are connected in a different manner during the first and second portion of the operating cycle. FIG. 3 shows how the components in the system are connected during the first portion of each operating cycle. FIG. 4 shows how the components are connected during the second portion of each operating cycle.

As shown in FIG. 3, during the first portion of each operating cycle, the circuit is connected so that the on-chip filter 110C can be adjusted. During the first portion of each operating cycle, the frequency characteristics of on chip filter 110C are made to match the frequency characteristics of external filter 111. This portion of the cycle requires approximately 4.3 milliseconds. After the first portion of each operating cycle, the on-chip filter 110C and the off-chip filter 111 are connected in series as shown in FIG. 4 and the receiver is activated for approximately 33 milliseconds. As explained in the above referenced Gaskill patent, while the receiver is only active for a short period of time, this is time enough to span one time slot in a time slot protocol. In the third, and relatively long portion of each operating cycle, the receiver is deactivated.

FIG. 5 shows the details of the on-chip filter 110C. On-chip filter 110C is a two pole filter which includes two coupled resonators 550A and 550B. The two resonators 550A and 550B are connected by a series coupling capacitor 550C. Resonator 550A includes on-chip capacitors 501A and 502A, gyrator 503A, and variable resistor 504A. Resonator 550B includes on-chip capacitors 501B and 502B, gyrator 503B and variable resistor 504B. The on-chip components shown in FIG. 5 are connected in a conventional fashion to form a band pass filter. Such filters are well know; however, it is also well known that such on-chip gyrators working at 10.7 mHz are relatively unstable. That is, once they are adjusted to certain parameters, they will retain those values for only a short period of time.

The present invention takes advantage of the fact that the receiver 110A is only active for a very short period, that is, for 33 milliseconds. Thus, the parameters are adjusted during the first portion of each cycle and they only need retain their value for the 33 milliseconds that the receiver is active during the second portion of each cycle. Unique to the invention is the fact that the parameters are automatically adjusted each time that the receiver 110 is activated.

The particular adaptive algorithm used to adjust the parameters or gyrators 503A and 503B is not relevant to the present invention and such adjustment algorithms are known in the art. For example the algorithm shown in a paper by D. A. Johns, W. M. Snelgrove, and A. S. Sedra entitled "*Continuous-Time Analog Adaptive Recursive Filters*" published in ISCAS 1989 pages 667-669.

As shown in FIG. 3, during the first or "adjustment" portion of each operating cycle the antenna 116 is removed and the RF amplifier 22 is connected to a fixed voltage. Mixer 28 and IF amplifier 34 are connected in series, thus providing a "white noise" signal input to filters 110C and 111. The output of filters 110C and 111 are compared by comparator 110B, and if they are not equal a signal is sent to adjustment circuit 112. The adjustment process continues until both filters 110 and 111 produce the same output signal. At this point the on-chip filter 110C has the same frequency response as does external filter 111 and the first portion of each operating cycle ends. Next the components are connected as shown in FIG. 4. The gates 113A for switching the connections are not specifically shown in FIGS. 3 and 4 since such gates can be conventional. The switching gates 113A are activated by cycle timer 13A as shown in FIG. 1.

As shown in FIG. 4, during the receive portion of each cycle, the components are connected as a receiver such as that shown in the previously referenced patent application. This connection will be explained in detail with reference to FIG. 6.

The details of how receiver 110 is connected into the system during the second or "receive" portion of each cycle are shown in FIG. 6. The system as shown in FIG. 6 includes an RF stage 10, an IF stage 12 and a baseband stage 14. The RF stage 10 includes an antenna 116 which may be fabricated into the wristband 17 of the wristwatch 19 in which the receiver 8 is mounted. (A suitable wristwatch enclosure is described in the Gaskill et al patent). The antenna 116 provides RF signals to an antenna tuner stage 18.

Antenna tuner stage 18 is a conventional varactor controlled bandpass filter which also performs limited impedance match functions. A tuning voltage is applied to a tune voltage port 20 from a microprocessor based control system not shown earlier. Such a microprocessor system is discussed in Gaskill et al. The voltage supplied via port 20 tunes a voltage-variable capacitor in tuner 18.

The antenna tuner 18 also serves a limited impedance transformation function. The antenna 116 is typically a very small loop and consequently has a very small impedance. Receiver performance and noise figure are optimized if this impedance is transformed up to more closely match the input impedance of the following RF amplifier stage 22.

RF amplifier stage 22 is a low noise broadband amplifier tuned for maximum gain in the FM broadcast band (88-108 megahertz). The maximum gain of RF amplifier stage 22 is approximately 10 dB. The actual gain is controlled by an AGC control circuit discussed below. A receiver mixer stage 26 is provided with a wide band of amplified input signals.

To minimize the effect of image signals which pass the tuner stage 18, mixer stage 26 is configured in an image canceling topology. Two individual quad mixers 28 and 30 are driven with quadrature local oscillator signals on lines 27 and 29 from a local oscillator synthesizer 31. High side injection is used, so the local oscillator tunes the 98.7 to 118.7 megahertz range to yield a 10.7 megahertz intermediate frequency.

The output of the mixer 28 driven from local oscillator line 27 is delayed 90 degrees and is combined with the output of the mixer 30 that is driven from the delayed local oscillator line 29. The combination of these signals cancels any image response while reinforcing the desired signal response. Mixer 26 has a conversion gain at the desired signal frequency of approximately 7 dB.

The output of mixer stage 26 is provided to an IF chain 32 comprised of two IF amplifiers 34 and 36 and ceramic band pass filters 111 and adaptive filter 110A. As shown in the previously referenced patent applied the filter 110 is of chip construction and may be of the SFEC 10.7 series manufactured by Murata. In accordance with the present invention only filter 40 is implemented using an IC chip. IF amplifiers 34 and 36 have gains of approximately 20 dB each and filters 38 and 49 have about 6 dB each of loss. The IF amplifiers 34 and 35 can be gain controlled, to optimize noise figure.

The output of IF chain 32 is provided to a synchronous, or coherent detector comprised of a mixer 49 injected with a 10.7 megahertz local oscillator signal. The synchronous detection process adds the side band signal voltage and the side band noise powers, resulting in a 3 dB improvement in signal-to noise ratio. The technique also permits detection at a much lower signal level than would be possible if a limiter stage was employed. Consequently, the IF stage gain can be lower than would normally be the case, thereby reducing the risk of feedback.

The local oscillator 48 which provides the 10.7 megahertz signal is locked to the frequency of the IF by a feedback circuit 71, discussed below. A 90 degree phase shift of the local oscillator signal by a phase shifter 47 causes the signal output by mixer 49 to an output line 51 to be proportional to the frequency of the signal modulating the 10.7 megahertz IF. This baseband frequency modulated signal is fed to a low pass filter 52 and then to a baseband amplifier 53. Baseband amplifier 53 has a break point of about five kilohertz for discrimination against the left plus right FM stereo channel. The breakpoint also minimizes distortion caused by the main audio channel bleeding into the subcarrier channel. The high end rolloff breakpoint is at about 150 kilohertz. The output of the baseband amplifier 53 is provided to conventional decoder circuitry, as disclosed in the Gaskill et al. patent.

A second synchronous detector is also driven by the IF chain 32 and provides an AGC signal for application to the RF and IF gain stages. This second synchronous detector again includes a mixer 60, this one driven in phase with the 10.7 megahertz local oscillator signal. The output of this mixer 60 is thus related to the amplitude of the IF signal and can be used to gain control preceding stages.

The limiting stages found in most FM receivers were found disadvantageous in the present system. Limiting does not benefit the receiver's signal-to noise or signal-to-interference ratio due to the low modulation index of the subcarrier being decoded. Consequently, the automatic gain control technique was employed.

The AGC circuitry 24 employed in the preferred embodiment of the present invention is disclosed in pending U.S. patent application Ser. No. 07/146,446 of Suter entitled "AGC Delay on an Integrated Circuit," the disclosure of which is incorporated herein by reference. An AGC loop filter 70 is a single RC stage with a break point at about one kilohertz. All other bypassing of AGC points is done with much higher break points so that the one pole is clearly dominant.

Radio receiver as shown herein is AFC controlled in a relatively continual manner. AFC is effected by a DC component on the feedback loop 71 produced by a synchronous detector 49. An amplifier 74 is included to insure that the loop gain is high enough to control local oscillator drift.

The AFC loop controls two local oscillators: The synthesized local oscillator 31 used for high side RF injection and the 10.7 megahertz local oscillator 48 used by the synchronous detectors 49 and 60. Both oscillators respond to any DC component on the feedback loop 71 to adjust their frequencies to minimize the resulting DC output from synchronous detector 49.

The AFC feature is included here not for threshold extension (which is not viable with a low modulation index), but to reduce cross-modulation of entertainment energy into the receiver's subspectrum due to distortion in the filters 111 and 110B. AFC of the synthesizer 31 can be disabled by a switch 72, which can be operated to apply a fixed reference voltage to the synthesizer 31 instead of the AFC signal.

Further details concerning the operation and system organization of the receiver shown in FIG. 6 can be found in the previously referenced co-pending patent application.

While the invention has been described with reference to a preferred embodiment thereof, it will be understood by those skilled in the art that various changes in form and details may be made without departing from the scope of the invention.

I claim:

1. A single chip radio receiver designed for use in a radio pager said radio receiver having first and second filters which operate within a set of specifications to form an IF filter, said radio pager only being active for a very short time slot during a relative long repeat cycle, comprising, an integrated circuit chip having radio receiver components thereon, including components connected to form said first filter which comprises capacitors and gyrators, an external off-chip filter connected to form said second filter, means for adjusting said on-chip filter to match said off-chip filter when said receiver is not operating, means for connecting said on-chip and said off-chip filters together as said IF filter, whereby said receiver can operate for a short period of time before said on-chip components drift out of said specification.

2. A method of operating an integrated circuit radio receiver having an on-chip adaptive filter and a discrete filter, the method comprising the steps of:

connecting the adaptive filter and the discrete filter to a tuning circuit, tuning the adaptive to form a tuned filter which emulates said discrete filter, reconnecting the discrete filter and said tuned filter adaptive filter in the radio receiver circuit, activating said radio receiver for a period shorter than the stable time period of said adaptive filter, deactivating said radio receiver, whereby during the active period of said receiver, said adaptive filter and said discrete filter operate in similar fashion.

3. The radio receiver in claim 2 wherein said adaptive filter includes a gyrator.

4. A radio receiver on an integrated chip said receiver including first on-chip IF filter and a second external IF filter said receiver including;

means for activating said receiver intermittently, each active period being relatively short, on-chip components forming said first on-chip IF filter, external components forming said second external IF filter, means for adjusting said on-chip IF filter to match said external IF filter prior to each active period of said receiver, whereby said on-chip filter can maintain said setting for said short period of time said receiver is active.

5. The radio receiver recited in claim 4 wherein said radio receiver is an FM receiver.

6. The radio receiver recited in claim 1 wherein said receiver is an FM receiver.

7. The method recited in claim 2 wherein said radio receiver is an FM receiver.

8. The receiver recited in claim 1 wherein said time slot is less than 40 milliseconds long, and wherein said on-chip filter is substantially matched to said external filter during each active period of said receiver.

* * * * *